US006108178A

United States Patent [19]

Beadles

[11] Patent Number: 6,108,178

[45] Date of Patent: Aug. 22, 2000

[54] TATTLETALE CHILD SAFETY OUTLET COVER

[76] Inventor: Keith Alan Beadles, 4322 N. Woodlawn Ct., Wichita, Kans. 67220

[21] Appl. No.: 09/261,377

[22] Filed: Mar. 3, 1999

[51] Int. Cl.$^{7}$ .................................................. H02H 3/00

[52] U.S. Cl. ............................ 361/1; 361/635; 361/653

[58] Field of Search ............................ 361/1; 340/635, 340/653, 654, 656

[56] References Cited

U.S. PATENT DOCUMENTS

| | | | |
|---|---|---|---|
| 3,974,492 | 8/1976 | Girismen | 340/635 |
| 4,484,185 | 11/1984 | Graves | 340/656 |
| 4,616,285 | 10/1986 | Sackett | 361/1 |
| 4,853,823 | 8/1989 | Arechavaleta et al. | 361/100 |

*Primary Examiner*—Michael J. Sherry

[57] ABSTRACT

A child safety outlet cover that plugs into and completely covers electrical wall outlets. The outlet cover has a door on the front of the cover which allows power cords to plug into a wall outlet and yet the plugs and outlet remain covered. The door is equipped with a childproof safety latch to keep children from opening the door. If the door is opened an alarm will sound and electricity to the outlet cover will shut off. Even with the door closed there is no power to the outlet cover unless a power cord is plugged into the outlet cover.

3 Claims, 3 Drawing Sheets

FIG. 1
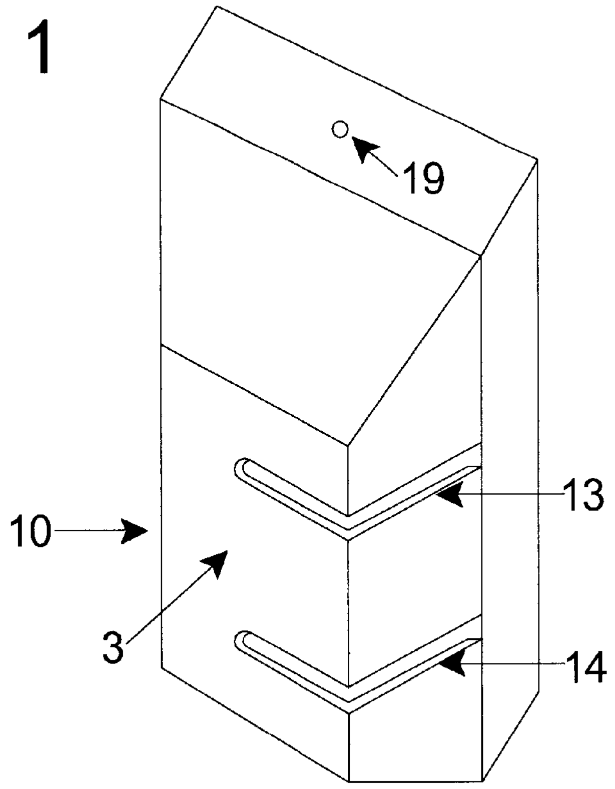
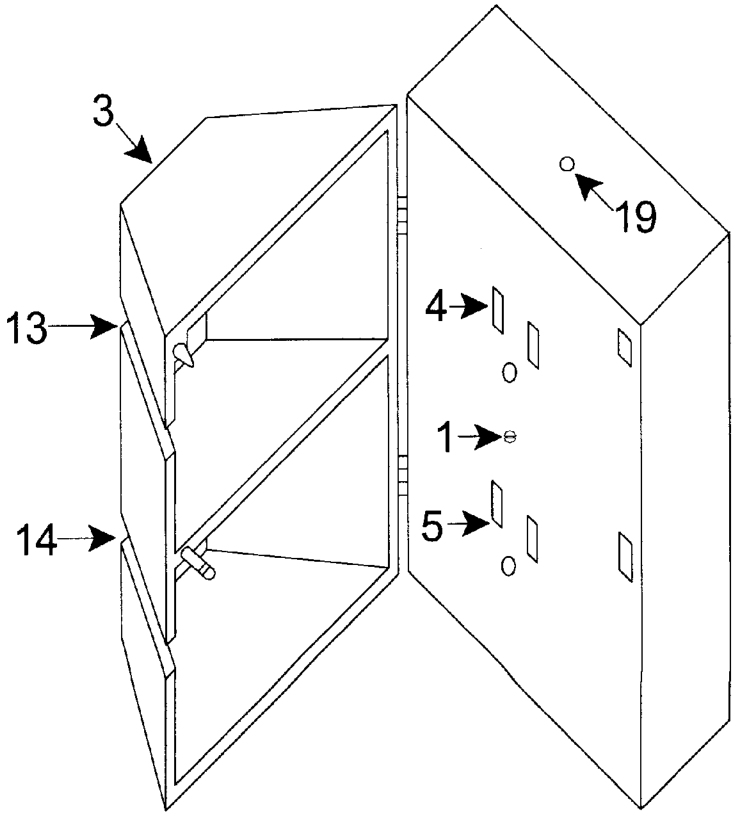
FIG. 2

TATTLETALE CHILD SAFETY OUTLET COVER

BACKGROUND OF THE INVENTION

This invention relates to a outlet cover, more specifically, a device which is meant to prevent children from electrical shock do to tampering with electrical outlets.

Small children will tamper with outlet covers. If the parent or guardian is not aware of tampering intervention may be to late to prevent electrical shock. Prior outlet covers do not address the fact that children will tamper and get passed outlet covers resulting in electrical shock.

BRIEF SUMMARY OF THE INVENTION

The object of this invention is to provide an improved childproof safety outlet cover that will alert the parent upon tampering with the outlet and remove the threat of electrical shock.

The TattleTale Child Safety Outlet Cover is a small device that completely covers electrical wall outlets providing a safe barrier between children and 110 volts of deadly electricity. The TattleTale Child Safety Outlet Cover has been designed with a door on the front of the cover which allows power cords to plug into wall outlet and yet the outlet remains covered. The door is equipped with a childproof safety latch to keep children from opening the door. Should a child figure out how to open the door, as all children sooner or later find ways to get passed childproof gadgets, an alarm will sound alerting the parent that the child is within inches of deadly electricity. Not only will the TattleTale sound an alarm, but as soon as the door on the cover begins to open the TattleTale will automatically shut off electricity to the outlet cover. Even with the door closed there is no power to the outlet cover unless a power cord is plugged into the outlet cover, in addition to this each plug on the outlet cover is independent of the other.

BRIEF DESCRIPTION OF THE SEVERAL VIEWS OF THE DRAWING

FIG. 1 is a front view at a 45 degree angle of the TattleTale Child Safety Outlet Cover.

FIG. 2 is a view of the TattleTale Child Safety Outlet Cover with the childproof door open.

DETAILED DESCRIPTION OF THE INVENTION

Figure 3:
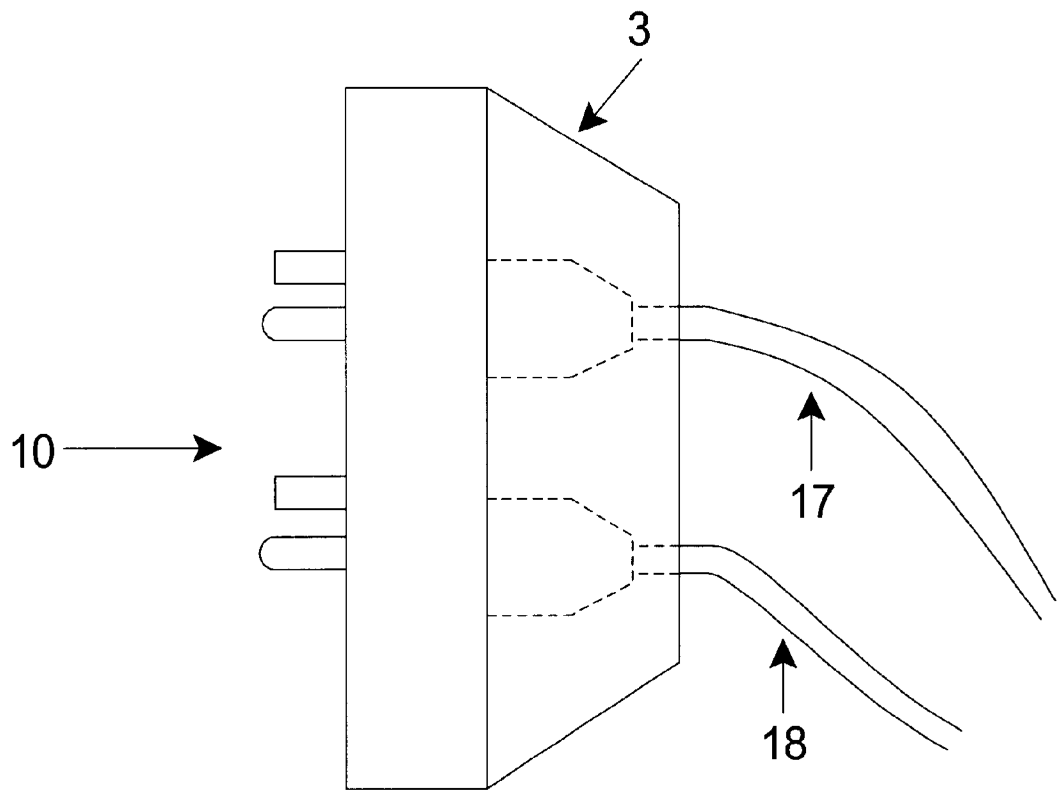
FIG. 3 is a side view of the TattleTale Child Safety Outlet Cover with two power cords plugged into the outlet cover.
Figure 4:
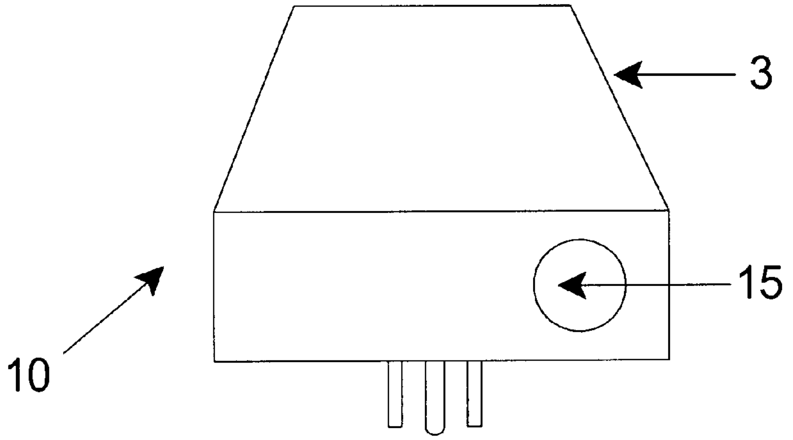
FIG. 4 is a bottom view of the TattleTale Child Safety Outlet Cover.
Figure 5:
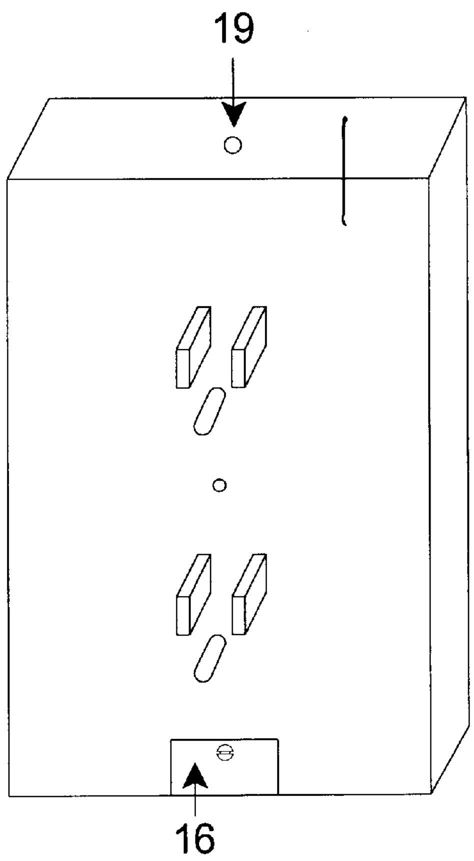
FIG. 5 is a back view of the TattleTale Child Safety Outlet Cover.
Figure 6:
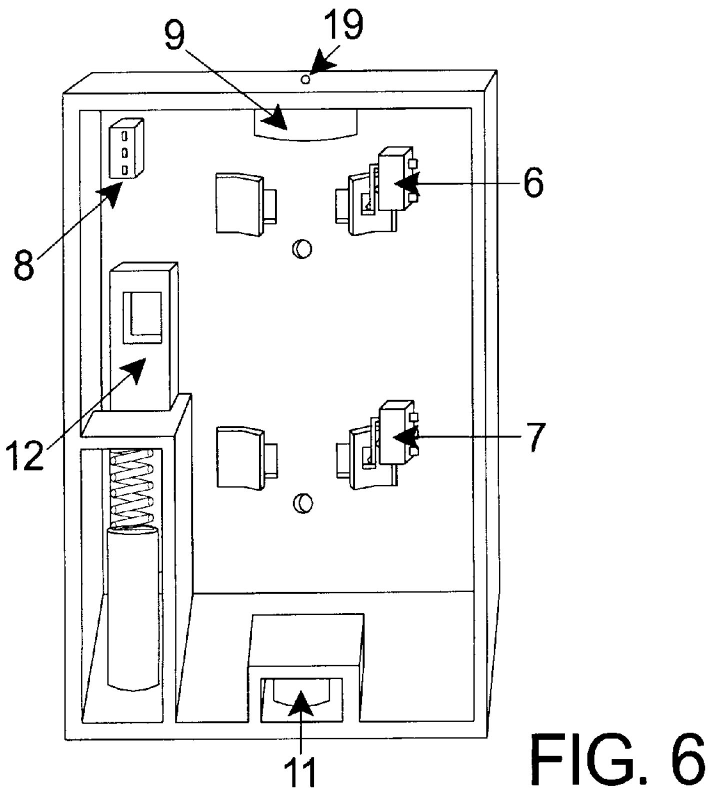
FIG. 6 is a back view looking inside the TattleTale Child Safety Outlet Cover showing the internal components.

Referring to FIG. 1 the TattleTale Child Safety Outlet Cover indicated generally at 10, is a device that plugs into and covers electrical outlets. This device is preferably fabricated from plastic. The TattleTale Child Safety Outlet Cover plugs into the outlet and is secured with a screw (FIG. 2 reference number 1). With the childproof door 3 open power cords can be inserted into the plug receptacles 4,5. When a power cord is inserted into either one of the plug receptacles 4,5 it actuates a receptacle switch (receptacle switches shown in FIG. 6 reference numbers 6 and 7) which will allow power to that receptacle once the childproof door 3 is closed. When the childproof door 3 is closed a door switch 8 is actuated which allows power to the receptacle switches 6,7. The slots (FIG. 1 reference numbers 13, 14 ) in the childproof door 3 allow power cords 17, 18 to remain plugged into the receptacles 4,5 with the childproof door 3 in the closed position (shown in FIG. 3). If the childproof door 3 is opened an alarm (FIG. 6 reference number 9) sounds resonating through the alarm resonate hole 19. The alarm 9 is controlled by the door switch 8 and powered by a battery 11. The childproof door 3 is held closed by the childproof safety latch 12. The latch 12 is released by pushing the latch release button (latch release button shown in FIG. 4 reference number 15). The battery compartment cover 16 is shown in FIG. 5.

What is claimed is:

1. A child safety outlet cover for covering a household electrical outlet which has two three-prong receptacles, comprising:

a housing with two sets of three-prongs on the back side, wherein said prongs plug into the two three-prong receptacles on the household electrical outlet, connecting the housing to the household electrical outlet; and two three-prong receptacles, on the opposite side of the housing from the two sets of three-prongs, for receiving power cord plugs;

a child proof door connected to the housing with two hinges; wherein said door swings closed over the receptacle side of the housing to cover entire receptacle side of the housing; said door has two slots positioned so that when the door is in the closed position one slot is over each of the two receptacles on the housing, wherein said slots allow power cord plugs to remain plugged into the housing receptacles while the power cords pass through the slots;

a child proof safety latch which holds the door in the closed position;

a latch release button for releasing and allowing the door to swing to an open position;

two receptacle switches on the housing, wherein a receptacle switch is actuated when the power cord plug is inserted into one of the receptacles on the opposite side of the housing allowing power to the power cord plug once the door is closed; and a door switch which is actuated when the door is opened or closed, wherein the door switch allows power to the receptacle switches when the door is closed, and sounds an alarm and cuts off power to the outlet cover when the door is opened.

2. The child safety outlet cover of claim 1, further comprising a battery for powering the alarm.

3. The child safety outlet cover of claim 2, wherein the housing is secured with a screw.

* * * * *